United States Patent [19]

Lewis, Sr.

[11] 4,156,419
[45] May 29, 1979

[54] SOLAR COLLECTOR

[75] Inventor: Ray H. Lewis, Sr., Fountain Valley, Calif.

[73] Assignee: Hawthorne Industries, Inc., West Palm Beach, Fla.

[21] Appl. No.: 695,009

[22] Filed: Jun. 11, 1976

[51] Int. Cl.² .............................................. F24J 3/02
[52] U.S. Cl. ..................................... 126/271; 165/170
[58] Field of Search ............... 126/271, 270; 237/1 A; 165/168, 170, 133; 29/157 R, 157.3 R

[56] References Cited

U.S. PATENT DOCUMENTS

| 3,239,000 | 3/1966 | Meagher | 126/271 |
|---|---|---|---|
| 3,239,922 | 3/1966 | Hansson | 165/170 |
| 3,390,672 | 7/1968 | Snelling | 126/271 |
| 3,613,779 | 10/1971 | Brown | 165/133 |
| 3,799,145 | 3/1974 | Butterfield | 126/271 |
| 3,934,323 | 1/1976 | Ford | 126/271 |
| 3,981,294 | 9/1976 | Deminet | 126/271 |

FOREIGN PATENT DOCUMENTS

| 391142 | 7/1922 | Fed. Rep. of Germany | 165/168 |
|---|---|---|---|
| 444017 | 1/1949 | Italy | 165/168 |
| 886194 | 1/1962 | United Kingdom | 165/170 |

Primary Examiner—Albert W. Davis, Jr.
Assistant Examiner—James C. Yeung
Attorney, Agent, or Firm—Barry L. Haley; Eugene F. Malin

[57] ABSTRACT

A flat plate collector of parallelepipedal configuration for a solar energy system, comprising a plane collective surface for the reception of solar energy with internal channels designed to maximize turbulent flow of heat-absorptive fluid therethrough and provide a maximum of heat absorptive surface in proportion to the volume of fluid content. As designed, the collector is adaptable to mass, low-cost production.

2 Claims, 5 Drawing Figures

SOLAR COLLECTOR

This invention is directed to a form of collector for a solar energy system.

One of the objects of the invention is to provide a low-cost, highly efficient collector which can be mass produced. Another objective is to provide a design of collector to subject a maximum of volume of heat-absorptive fluid passing therethrough in proportion to the collector surface exposed to solar rays.

It is a desideratum in collector design to provide means for increasing the turbulence of the heat-absorptive fluid as it flows through the collector. Thus, a further object of this invention is to provide integral inexpensive means to create and maintain turbulence in the heat-absorptive fluid.

By test, I have found that my permanently oriented collector can approach and surpass both the all-day and instantaneous efficiencies of similarly oriented conventional collectors.

These and other objects of the invention will be shown in the drawings and the description thereof and be more particularly pointed out in the appended claims.

Figure 1:
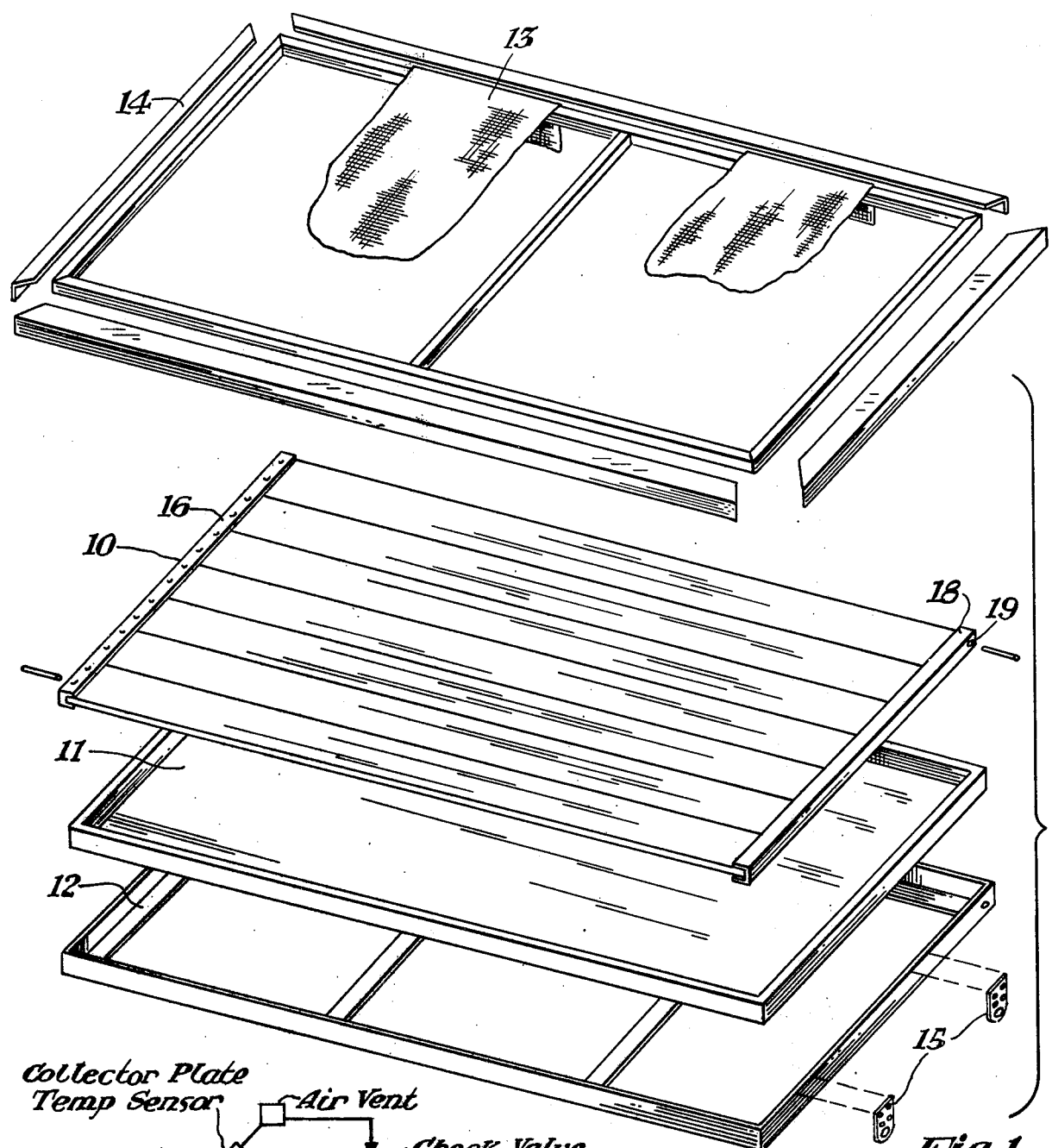
FIG. 1 is an exploded perspective view of my collector with associated elements preliminary to mounting on the roof of a building.

Referring to FIG. 1, 10 indicates generally my collector assembly; 11 the insulator pan, 12 its support frame, 13 the sun screen, 14 the closure frame for the sun screen, 13, and 15 the anchor legs for anchoring the device when assembled to a rooftop.

Figure 5:
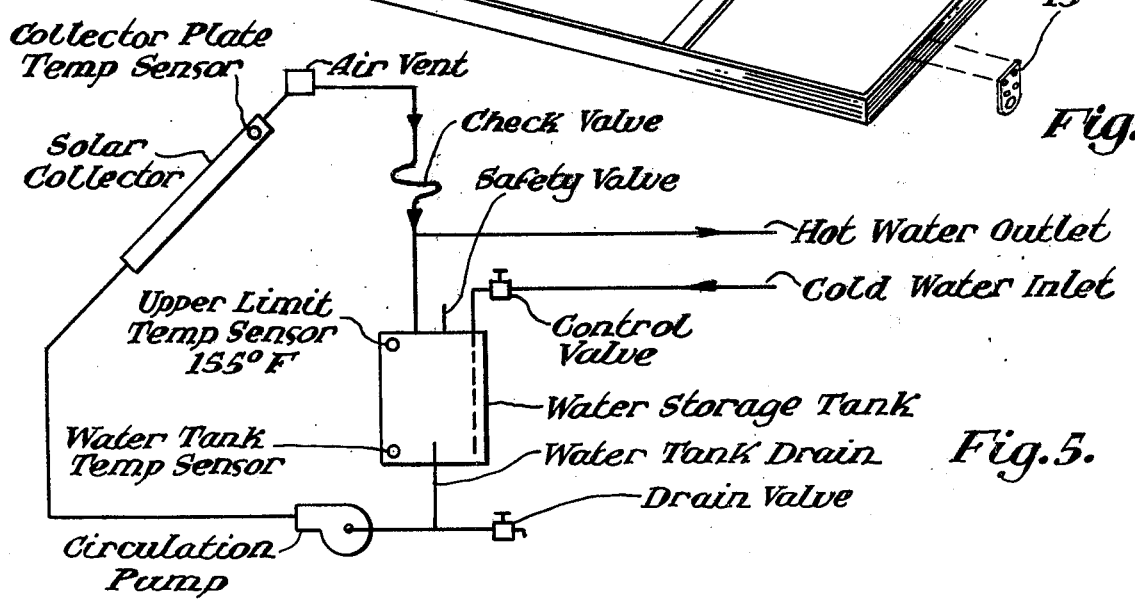
FIG. 5 is a schematic view showing the collector and related elements in a hypothetical installation.

Reference numeral 16 indicates a first manifold with an orifice 17 for a fluid input, connected to a source of heat-absorptive fluid, not shown. Numeral 18 designates a second manifold positioned at the end of the collector 10 opposite to the first manifold 16, with an orifice 19 for connection with a fluid output to a heat exchanger, for example, shown only schematically in FIG. 5. The arrangement of these several elements is shown in FIG. 1.

Figure 2:
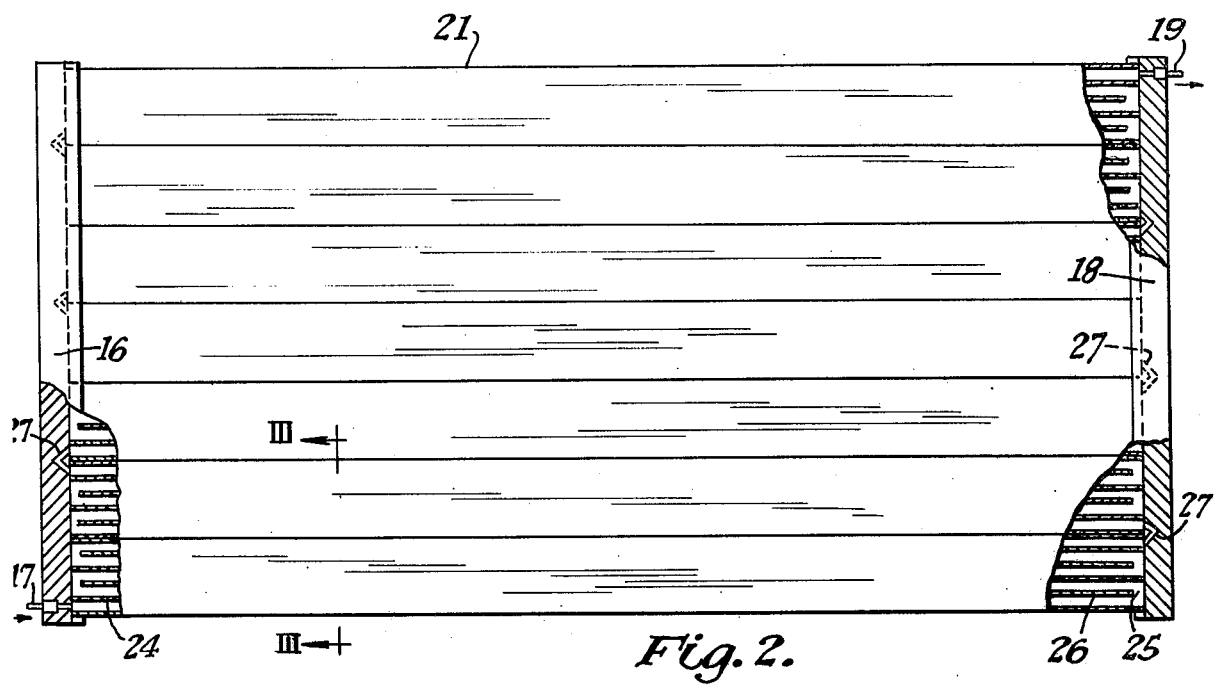
FIG. 2 is a plan view of a series of my collector elements, in assembled form, partly broken away at each end to show the pathway of fluid movement through the collector.
Figure 3:
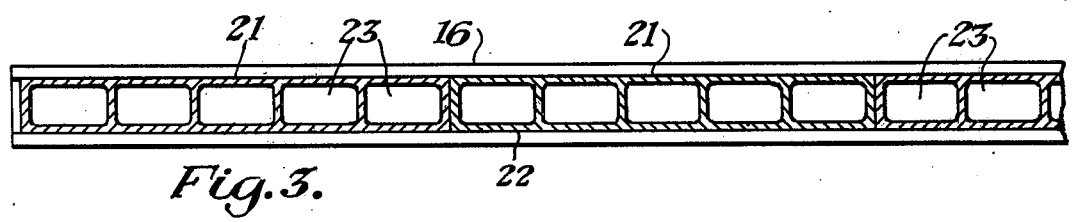
FIG. 3 is a sectional view along the line 3—3 of FIG. 2.

Referring now specifically to FIG. 2, my collector has an upper surface 21 and a lower surface 22, FIG. 3. Between the surfaces are a number of channels 23-23, FIG. 3. Between the first and second channel in contact with the closed side of the first manifold is a barrier 24. At the opposite end of the first and second channels is an opening or passage 25 defined by a passage plate 26, comprising the open end of the wall between the channels. At appropriate locations within the manifolds 16-18, are channels 27, FIG. 2, for passage of the heat-absorptive fluid from one element of the collector to the next contiguous element.

The interior walls of the channels are coated with a thin film of a tetraflorethylene, the purpose of which is threefold:

(a) the smooth surface of the coating reduces head pressure with a lower power draw for the circulation of water through the unit;

(b) the accumulation of mineral deposits is minimized, maintaining the efficiency of the unit and likewise minimizing the subjection of the metal from which the unit is extruded to chemical and electrical corrosion;

(c) the turbulence of the heat-absorptive fluid passing through the channels is maximized by reducing the tendency to laminar fluid flow.

Maintenance of turbulence is an important consideration in an efficient collector since it subjects a greater proportion of the heat-absorptive fluid to the solar rays as they are absorbed by the collector.

In the commercial embodiments of my device, the collector has an optimum length of seven feet and a width of six inches, as shown, with five channels of rectangular configuration with eighth-inch radii in the corners, approximately 1-1/16 inches in the longer cross-sectional dimension and ½ inches in the shorter cross-sectional dimension; thus more than one-half of the cubic content of the collector in its over-all dimensions is available for fluid passage. And, in contrast with the conventional flat plate collector with water tubes, in my collector's parallelepipedal configuration, at least forty percentum of the exterior surface is exposed to the rays of the sun.

Figure 4:
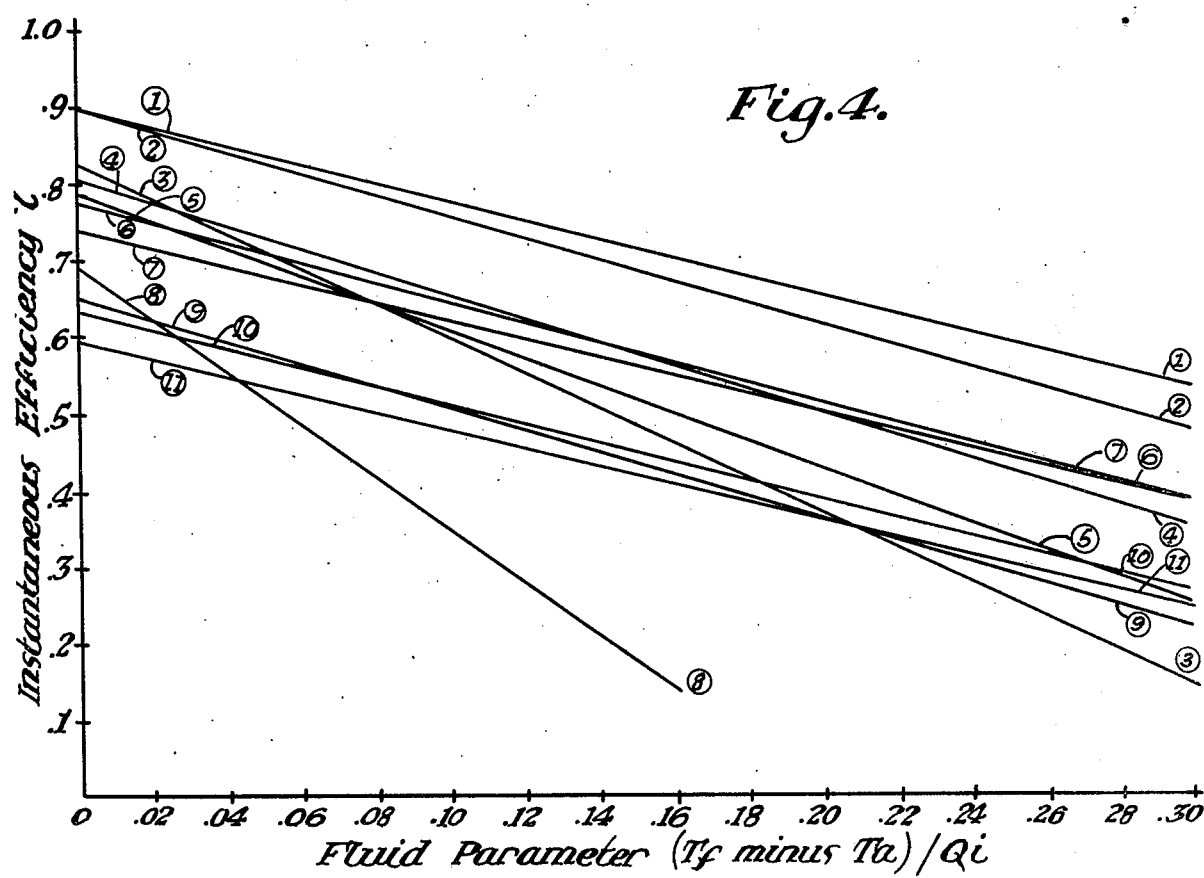
FIG. 4 is a graph showing the comparison of the test performance of my collector with the performance of conventional commercial models and the performance of sophisticated, mechanically-oriented types.

The efficacy of these design desiderata as embodied in my invention are indicated in the graph, FIG. 4, in which the respective curves show the performance as demonstrated by tests of the following types of collectors:

1 to 3.—Special design, finned copper coils;
4.—The flat plate collector of this application;
5.—Special design, finned copper coil;
6 to 8 and 10 and 11.—Flat plate;
9.—Commercial test flat plate (test control).

Test Sample 9 was similar in design to the collector of the solar water heater shown in FIG. 2, Solar Heating and Cooling, John A. Duffie and William A. Beckman, SCIENCE, Jan. 16, 1976, p. 145. The Y-axis in the graph, FIG. 4, is instantaneous efficiency, against a fluid parameter $(T_f \text{ minus } T_a)/Q_i$, quantities well known in the art of measuring solar collector efficiencies. The observation data of instantaneous efficiency for Items 4 (the flat plate collector of this application) and 9, the control, supra, are shown in the following table:

| Test Collector | Control |
|---|---|
| 0.8049 | 0.6548 |
| 0.7406 | 0.5897 |
| 0.6714 | 0.5217 |
| 0.5973 | 0.4507 |
| 0.5182 | 0.3768 |
| 0.4341 | 0.3000 |
| 0.3451 | 0.2203 |

It is obvious from the foregoing that the arrangement of my invention permits the attainment of unexpected efficiencies which approach those of much more expensive arrangements, and at the same time the device can be mass produced in volume at low cost.

While I have shown and described only one collector element, it is obvious that they can be assembled in series, the output of the first collector being connected to the input of the second and so on in series until the desired number of collectors has been assembled for rooftop installation.

Having fully described my invention, I claim:

1. In a system for heating a fluid with solar radiant energy, said system including a solar radiant energy collector that carries a fluid medium to be heated by solar radiant energy, the collector having the improvement of:

a fluid inlet connecting means;

a fluid outlet connecting means;

an extruded flat metallic conduit connected at one end to the fluid inlet means and at the opposite end to the fluid outlet means, said extruded conduit having a substantially rectangular cross-section, said conduit including an integrally formed thin barrier defining two separate fluid carrying channels within said conduit, each of said separate fluid carrying channels being substantially rectangular in cross-section; and means connected to one end of said conduit for directing fluid from one of the said separate channels into an adjacent separate channel for defining a serpentine fluid flow path through said collector between said inlet and outlet connecting means, said collector having an exterior of which is of parallelepipedal configuration, and the interior capacity thereof, available for fluid flow therethrough, is more than one-half of the gross cubical bulk of the panel.

2. A collector in accordance with claim 1, the exterior of which is of parallelepipedal configuration, at least forty percentum of the exterior surface of which is exposable to the rays of the sun.

* * * * *